US008553158B2

(12) United States Patent
Ishii (10) Patent No.: US 8,553,158 B2
(45) Date of Patent: Oct. 8, 2013

(54) BROADCAST RECEIVING APPARATUS, METHOD FOR SETTING THE SAME, AND PROGRAM FOR SETTING THE SAME (75) Inventor: Kensuke Ishii, Kanagawa (JP)

(73) Assignee: Sony Corporation (JP)

( * ) Notice: Subject to any disclaimer, the term of this patent is extended or adjusted under 35 U.S.C. 154(b) by 585 days.

(21) Appl. No.: 12/584,018

(22) Filed: Aug. 28, 2009

(65) Prior Publication Data

US 2010/0060799 A1    Mar. 11, 2010

(30) Foreign Application Priority Data

Sep. 5, 2008  (JP) ................ P2008-228520

(51) Int. Cl.
H04N 5/50       (2006.01)
G06F 3/00       (2006.01)
G06F 13/00      (2006.01)
H04N 5/445      (2011.01)
H04B 17/02      (2006.01)
H04B 1/06       (2006.01)
H04B 7/00       (2006.01)

(52) U.S. Cl.
USPC ............ 348/732; 348/731; 725/39; 455/133; 455/232.1

(58) Field of Classification Search
None
See application file for complete search history.

(56) References Cited

U.S. PATENT DOCUMENTS 4,223,352 A *   9/1980  Belisomi ................ 348/732
2006/0209217 A1* 9/2006  Onomatsu et al. ........... 348/732
2006/0276149 A1* 12/2006 Womac et al. ............... 455/133
2006/0282860 A1  12/2006 Hoda et al.
2008/0003966 A1* 1/2008  Magnusen ................ 455/232.1
2008/0154398 A1* 6/2008  Moorer et al. ................ 700/90
2008/0163295 A1* 7/2008  Watabe et al. ................. 725/39
2009/0046205 A1* 2/2009  Strasser et al. ............... 348/634

FOREIGN PATENT DOCUMENTS

| JP | 07067047 A   | 3/1995  |
| JP | 08084301 A   | 3/1996  |
| JP | 2001-230689 A| 8/2001  |
| JP | 2002171453 A | 6/2002  |
| JP | 2004266365 A | 9/2004  |
| JP | 2004-363806 A| 12/2004 |
| JP | 2006-352187 A| 12/2006 |
| JP | 2006-352488 A| 12/2006 |
| JP | 2007122353 A | 5/2007  |
| JP | 2007300543 A | 11/2007 |
| JP | 2008035317 A | 2/2008  |

OTHER PUBLICATIONS

Office Action from Japanese Application No. 2008-228520, dated Jun. 17, 2010.

* cited by examiner

Primary Examiner — Jefferey Harold
Assistant Examiner — Sean Haiem
(74) Attorney, Agent, or Firm — Lerner, David, Littenberg, Krumholz & Mentlik, LLP (57) ABSTRACT A broadcast receiving apparatus includes a channel scanning unit configured to perform a channel scanning process of scanning broadcast channels to be received, determining on each scanned broadcast channel whether the channel is receivable, and registering a broadcast channel determined as receivable, a function setting unit configured to perform settings of various functions, and a control unit configured to control the channel scanning unit and the function setting unit so that the channel scanning process is performed simultaneously with the settings of the various functions.

6 Claims, 6 Drawing Sheets

BROADCAST RECEIVING APPARATUS, METHOD FOR SETTING THE SAME, AND PROGRAM FOR SETTING THE SAME

CROSS-REFERENCE TO RELATED APPLICATION

The present application claims priority from Japanese Patent Application No. JP 2008-228520 filed in the Japanese Patent Office on Sep. 5, 2008, the entire content of which is incorporated herein by reference.

BACKGROUND OF THE INVENTION

1. Field of the Invention

The present invention relates to a broadcast receiving apparatus, a method for setting the broadcast receiving apparatus, and a program for setting the broadcast receiving apparatus. The present invention is preferably applied to, for example, a broadcast receiving apparatus capable of receiving digital terrestrial broadcasts.

2. Description of the Related Art

As for terrestrial television broadcasting, the transition from analog broadcasting to digital broadcasting (also called "digital terrestrial broadcasting") until 2011 has been determined. Accordingly, most of television broadcast receiving apparatuses sold recently support not only analog broadcasting but also digital terrestrial broadcasting.

In digital terrestrial broadcasting, the allocation of broadcast channels differs from area to area. Accordingly, after a television broadcast receiving apparatus is installed, a user has to perform a process of scanning broadcast channels to be received and registering receivable broadcast channels before the start of use of the apparatus. This process is also called a "channel scanning process".

During the channel scanning process, broadcast channels for digital terrestrial broadcasting are sequentially scanned to determine on each scanned channel (target channel) whether the scanned channel is receivable. Accordingly, it takes much time to complete the channel scanning process.

A method of registering receivable broadcast channels without performing the time-consuming channel scanning process is also used. According to this method, specifically, a television broadcast receiving apparatus previously stores information items (hereinafter, also referred to as "broadcast channel allocation information items") regarding the allocations of broadcast channels for respective areas, prompts a user to select an installation area where the apparatus is installed, retrieves broadcast channel allocation information for the selected area, and registers the broadcast channels.

As digital terrestrial broadcasting is becoming widespread, the number of relay stations for relaying digital terrestrial broadcasts increases. Consequently, the number of areas having different allocations of broadcast channels also increases. It is therefore complicated to generate broadcast channel allocation information items for respective areas. Furthermore, since the number of areas to be selected by the user increases, the user may be confused with the increased areas. In the future, therefore, it will be difficult to use the above-described method and the channel scanning process will have to be performed.

There has been proposed a television broadcast receiving apparatus that reduces time to determine whether a scanned broadcast channel is receivable, thus reducing time necessary for the channel scanning process. For example, Japanese Unexamined Patent Application Publication No. 2004-363806 discloses such a television broadcast receiving apparatus.

SUMMARY OF THE INVENTION

Most of television broadcast receiving apparatuses sold recently perform settings of various functions of the apparatus before and after the channel scanning process. Accordingly, such a television broadcast receiving apparatus has to perform the settings of the various functions in addition to the channel scanning process before a user is permitted to start using the apparatus.

In the television broadcast receiving apparatus, however, even if the time necessary for the channel scanning process can be reduced in the above-described related art, it takes much time until the user is permitted to start using the apparatus, since it also takes much time to perform the settings of the various functions of the apparatus in addition to the channel scanning process.

The present invention has been made in consideration of the above-described circumstances. It is desirable to provide a broadcast receiving apparatus that enables a user to start using the apparatus more immediately than a case where settings of various functions of the broadcast receiving apparatus is performed before and after a channel scanning process, a method for setting the broadcast receiving apparatus, and a program for setting the broadcast receiving apparatus.

According to an embodiment of the present invention, a broadcast receiving apparatus includes a channel scanning unit configured to perform a channel scanning process of scanning broadcast channels to be received, determining on each scanned broadcast channel whether the channel is receivable, and registering a broadcast channel determined as receivable, a function setting unit configured to perform settings of various functions, and a control unit configured to control the channel scanning unit and the function setting unit so that the channel scanning process is performed simultaneously with the settings of the various functions.

Accordingly, the time to complete both of the channel scanning process and the settings of the various functions of the broadcast receiving apparatus can be reduced as compared to the case where the settings of the various functions thereof are performed before and after the channel scanning process.

Embodiments of the present invention can realize the broadcast receiving apparatus that enables a user to start using the apparatus more immediately than the case where the settings of the various functions of the apparatus are performed before and after the channel scanning process, a method for setting the broadcast receiving apparatus, and a program for setting the broadcast receiving apparatus.

DESCRIPTION OF THE PREFERRED EMBODIMENTS

An embodiment of the present invention will be described below with reference to the attached drawings.

Circuit Configuration of Television Broadcast Receiving Apparatus

Figure 1:
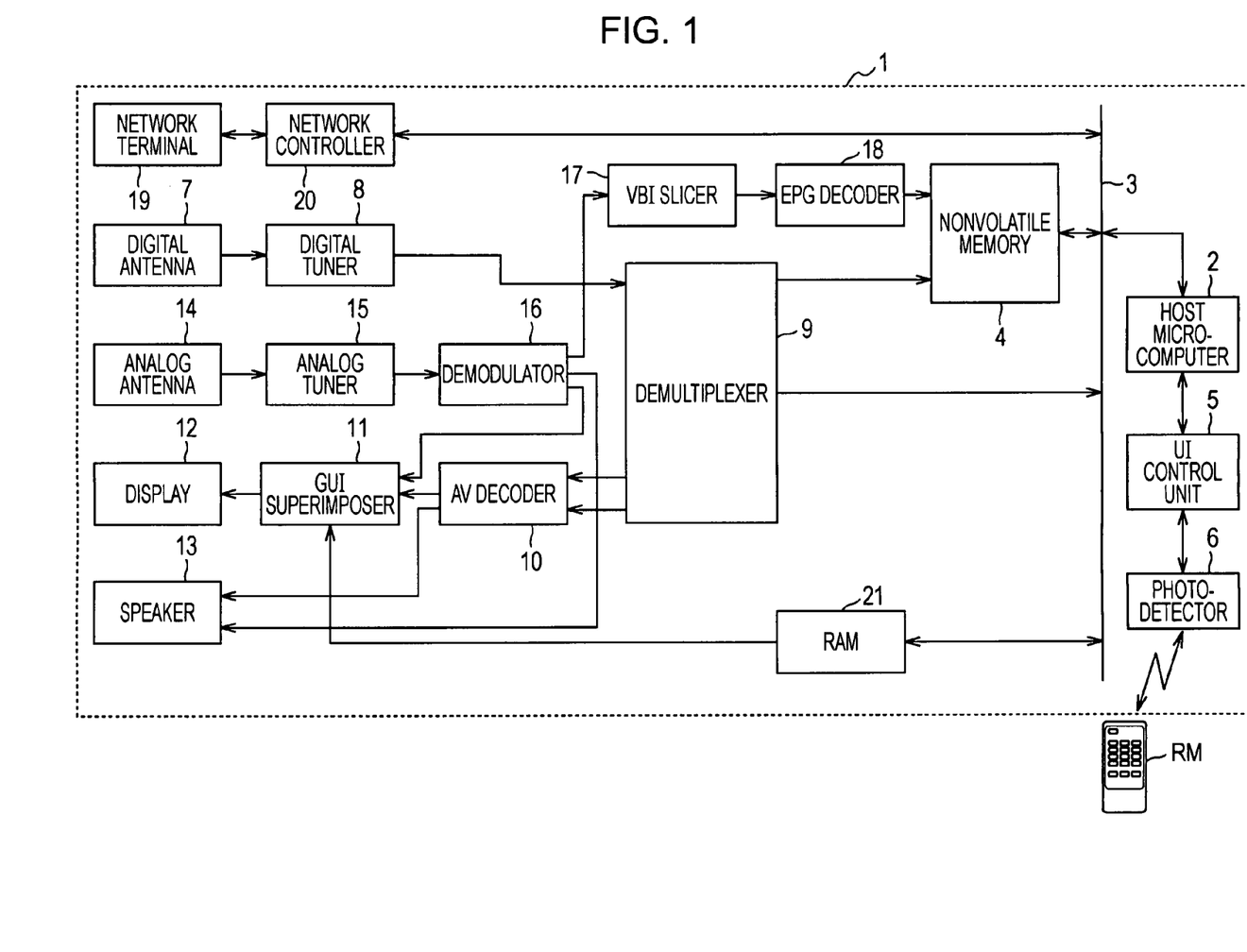
FIG. 1 is a block diagram of the circuit configuration of a television broadcast receiving apparatus.

FIG. 1 illustrates the circuit configuration of a television broadcast receiving apparatus 1 according to the embodiment of the present invention. The television broadcast receiving apparatus 1 principally includes a function of receiving and playing digital broadcasts (digital terrestrial broadcasts and digital satellite (BS (broadcasting satellite) and CS (communication satellite)) broadcasts) and analog broadcasts (analog terrestrial broadcasts) and a function of acquiring electronic program guide (EPG) information.

Specifically, the television broadcast receiving apparatus 1 performs various processes in accordance with a program stored in an internal memory (not shown) incorporated in a host microcomputer 2 or a nonvolatile memory 4 connected through a bus 3. The host microcomputer 2 receives an infrared signal supplied from a remote controller RM, namely, the signal corresponding to an operation performed on the remote controller RM as a command through a user interface (UI) control unit 5 and a photodetector 6. The host microcomputer 2 is configured to control operations of components in accordance with the command.

Actually, the television broadcast receiving apparatus 1 supplies digital broadcast signals (digital terrestrial broadcast signals or digital satellite broadcast signals) received through a digital antenna 7 to a digital tuner 8 under the control of the host microcomputer 2. The digital tuner 8 extracts a broadcast signal of a predetermined channel (for example, a channel designated through the remote controller RM) from the digital broadcast signals under the control of the host microcomputer 2. In addition, the digital tuner 8 demodulates and descrambles the extracted broadcast signal to obtain broadcast channel data and supplies the broadcast channel data to a demultiplexer 9.

The demultiplexer 9 demultiplexes video data and audio data from the broadcast channel data and transmits the video data and audio data to an audio and video (AV) decoder 10. The AV decoder 10 decodes the video data and the audio data to obtain a video signal and an audio signal. The AV decoder 10 transmits the video signal through a graphical user interface (GUI) superimposes 11 to a display 12 and also transmits the audio signal to a speaker 13. At that time, the GUI superimposer 11 superimposes a graphics signal including, for example, on-screen display (OSD) graphics onto the video signal.

In addition, the demultiplexer 9 demultiplexes data for data broadcasting (hereinafter, data-broadcasting data) from the broadcast channel data and stores the data-broadcasting data into the nonvolatile memory 4. The host microcomputer 2 generates data-broadcasting screen data on the basis of the data-broadcasting data stored in the nonvolatile memory 4. The host microcomputer 2 temporarily stores the data-broadcasting screen data into a random access memory (RAM) 21 through the bus 3 and then transmits the data-broadcasting screen data from the RAM 21 to the GUI superimposer 11. The GUI superimposer 11 generates a data-broadcasting screen signal on the basis of the data-broadcasting screen data and transmits the generated signal to the display 12.

Consequently, the display 12 of the television broadcast receiving apparatus 1 outputs a digital broadcast program video or a data broadcasting screen and the speaker 13 outputs program audio. As described above, the television broadcast receiving apparatus 1 receives digital broadcasts and then plays a video and audio of a program or displays a data broadcasting screen.

Furthermore, the television broadcast receiving apparatus 1 supplies analog broadcast signals received through an analog antenna 14 to an analog tuner 15 under the control of the host microcomputer 2. The analog tuner 15 extracts a broadcast signal of a predetermined channel from the analog broadcast signals under the control of the host microcomputer 2 and transmits the extracted broadcast signal to a demodulator 16. The demodulator 16 performs a predetermined demodulating process on the broadcast signal to obtain a demodulated signal. Furthermore, the demodulator 16 demultiplexes a video signal and an audio signal from the demodulated signal. The demodulator 16 transmits the video signal through the GUI superimposer 11 to the display 12 and also transmits the audio signal to the speaker 13. At that time, the GUI superimposer 11 superimposes a graphics signal including, for example, OSD graphics onto the video signal.

Thus, the display 12 of the television broadcast receiving apparatus 1 outputs a video of an analog broadcast program and the speaker 13 outputs audio of the program. As described above, the television broadcast receiving apparatus 1 receives analog broadcasts and plays a video and audio of a program.

In addition, the television broadcast receiving apparatus 1 allows the demultiplexer 9 to demultiplex digital-broadcast EPG information from broadcast channel data and allows the nonvolatile memory 4 to store the EPG information under the control of the host microcomputer 2.

Furthermore, the television broadcast receiving apparatus 1 transmits a demodulated signal obtained by the demodulator 16 to a vertical blanking interval (VBI) slicer 17 under the control of the host microcomputer 2. The VBI slicer 17 cuts out a specific line from the demodulated signal and supplies the line to an EPG decoder 18. The EPG decoder 18 decodes the specific line of the demodulated signal to obtain analog broadcast EPG information and stores the EPG information into the nonvolatile memory 4.

The television broadcast receiving apparatus 1 receives analog broadcast EPG information transmitted from an EPG information distribution server (not illustrated) through a network terminal 19 under the control of the host microcomputer 2. The host microcomputer 2 stores the received EPG information into the nonvolatile memory 4 through a network controller 20 and the bus 3.

As described above, the television broadcast receiving apparatus 1 obtains the EPG information. The EPG information includes as program information relating to programs to be broadcast, for example, broadcast station names, channel numbers, broadcast dates and times, program names, genres, the outlines of the programs, the descriptions of the programs, and performers.

In addition, the television broadcast receiving apparatus 1 allows the host microcomputer 2 to generate electronic program listing data on the basis of the EPG information stored in the nonvolatile memory 4 in accordance with an operation on the remote controller RM. The host microcomputer 2 temporarily stores the generated data into the RAM 21 through the bus 3 and then supplies the data from the RAM 21 to the GUI superimposer 11. The GUI superimposer 11 generates a screen signal on the basis of the electronic program listing data and supplies the signal to the display 12. Thus, the display 12 of the television broadcast receiving apparatus 1 displays an electronic program listing screen.

As described above, the television broadcast receiving apparatus 1 realizes a function of receiving and playing digital broadcasts (digital terrestrial broadcasts and digital satellite broadcasts) and analog broadcasts (analog terrestrial broadcasts) and a function of acquiring EPG information.

In addition, the television broadcast receiving apparatus 1 allows the host microcomputer 2 to read out data about a screen (hereinafter, also referred to as "setup screen") for performing various settings and various processes of the television broadcast receiving apparatus 1 from the nonvolatile memory 4 in accordance with a user operation. The host microcomputer 2 temporarily stores the data into the RAM 21 through the bus 3 and then transmits the data from the RAM 21 to the GUI superimposer 11. The GUI superimposer 11 generates a screen signal on the basis of the setup screen data and supplies the signal to the display 12. Thus, the display 12 of the television broadcast receiving apparatus 1 displays a setup screen.

When various settings are performed in the setup screen in accordance with user operations, the host microcomputer 2 stores setting information regarding the settings into the nonvolatile memory 4. Accordingly, after that, various processes are performed on the basis of the stored setting information in the television broadcast receiving apparatus 1. When an instruction to perform the various processes is given on the setup screen, the host microcomputer 2 performs the various processes in accordance with the instruction. The various settings of the television broadcast receiving apparatus 1 performed in the setup screen include, for example, settings of various functions, such as power consumption setting. The various processes of the television broadcast receiving apparatus 1 performed in the setup screen include, for example, a channel scanning process.

As described above, the various settings and various processes of the television broadcast receiving apparatus 1 can be performed through the setup screen displayed on the display 12.

Initial Settings

The television broadcast receiving apparatus 1 can receive and play analog broadcasts and digital broadcasts as described above. To allow the television broadcast receiving apparatus 1 to actually receive and play analog broadcasts and digital broadcasts, however, it is necessary to perform various settings (also referred to as "initial settings") after installation of the apparatus and before the start of use of the apparatus. The initial settings will be described below.

For example, when the host microcomputer 2 of the television broadcast receiving apparatus 1 recognizes that the apparatus has been turned on while initial settings of the apparatus are not yet performed, the host microcomputer 2 allows the display 12 to display an initial settings start screen (not shown).

This screen gives a message indicating that the television broadcast receiving apparatus 1 will start initial settings to a user and prompts the user to press an ENTER button (not shown) of the remote controller RM in order to proceed to the next screen after confirming the message. Each of the initial settings start screen and screens to be displayed during initial settings which will be described below is one of setup screens. As described above, therefore, the host microcomputer 2 controls the respective components to display the setup screens.

When the host microcomputer 2 recognizes that the user has pressed the ENTER button of the remote controller RM, the host microcomputer 2 allows the display 12 to display an analog broadcast channel registration start screen (not shown).

This screen prompts the user to select an item "Register analog broadcast channels" when the user intends to view an analog broadcast and select an item "Not register analog broadcast channels" when the user does not intend to do. Specifically, for example, selecting the item "Register analog broadcast channels" means that the user presses the ENTER button of the remote controller RM while a display field (not shown) for the item "Register analog broadcast channels" in the screen is selected with a cursor (not shown). As described above, the user can move the cursor to select a display field in each setup screen by operating the remote controller RM and select descriptions in the display field by pressing the ENTER button of the remote controller RM.

The host microcomputer 2 recognizes that the user has selected the item "Register analog broadcast channels" by operating the remote controller RM. After that, the host microcomputer 2 allows the display 12 to display an analog broadcast channel registering method selection screen (not shown).

This screen prompts the user to select either "Scanning" or "Automatic" as a method for analog broadcast channel registration. The term "Scanning" means a method of performing a channel scanning process (also called "channel scanning") to register receivable broadcast channels. The term "Automatic" means a method of prompting the user to select an installation area where the apparatus is installed, retrieving broadcast channel allocation information for the selected area from broadcast channel allocation information items for respective areas stored in the apparatus, and registering receivable broadcast channels on the basis of the retrieved information. Registering receivable broadcast channels using this method will also be called "automatic processing". According to the automatic processing, receivable broadcast channels can be registered for a short time, since channel scanning is not performed. For example, in an area out of a relay area covered by each relay station, however, it is difficult to determine which broadcast channel is receivable without actually performing the channel scanning. In such an area, the automatic processing is not available. The channel scanning has to be performed.

When the host microcomputer 2 recognizes that the user has selected "Scanning" by operating the remote controller RM, the host microcomputer 2 allows the display 12 to display a channel scanning screen (not shown) and also controls the respective components to perform channel scanning for analog broadcasts.

The channel scanning for analog broadcasts will now be described in detail. First, the host microcomputer 2 allows the analog tuner 15 to scan broadcast channels. The analog tuner 15 detects a signal strength of each broadcast channel by scanning and determines a broadcast channel having a signal strength of a predetermined value or higher as a broadcast channel receivable in this area, and sends information indicating the receivable broadcast channel or channels to the host microcomputer 2. The host microcomputer 2 registers the broadcast channels determined as receivable channels by the analog tuner 15 into an analog broadcast channel database constructed in the nonvolatile memory 4.

Whereas, when the host microcomputer 2 recognizes that the user has selected "Automatic" by operating the remote controller RM in the analog broadcast channel registering method selection screen, the host microcomputer 2 controls the respective components and performs automatic processing for analog broadcasts.

The automatic processing for analog broadcasts will now be concretely described. First, the host microcomputer 2 allows the display 12 to display an analog broadcast area setting screen (not shown). This screen prompts the user to select an installation area of the television broadcast receiving apparatus 1 in order to register analog channels. When the host microcomputer 2 recognizes that the user has selected an installation area of the apparatus by operating the remote controller RM, the host microcomputer 2 sets the area as an analog broadcast area. The host microcomputer 2 then retrieves broadcast channel allocation information for this area, set as the analog broadcast area, from the broadcast channel allocation information items for the respective areas previously stored in the nonvolatile memory 4. The host microcomputer 2 registers receivable broadcast channels indicated by the retrieved broadcast channel allocation information into the analog broadcast channel database constructed in the nonvolatile memory 4.

At the completion of the channel scanning or automatic processing, the host microcomputer 2 allows the display 12 to display an analog broadcast channel registration screen (not shown) displaying the broadcast channels registered in the analog broadcast channel database.

This screen provides a message indicating the analog broadcast channels registered as viewable channels to the user and prompts the user to press the ENTER button of the remote controller RM after confirming the message.

As described above, the television broadcast receiving apparatus 1 registers analog broadcast channels. Consequently, the television broadcast receiving apparatus 1 can receive and play broadcasts of the broadcast channels registered in the analog broadcast channel database. In other words, analog broadcasts are viewable.

Subsequently, the host microcomputer 2 allows the display 12 to display a digital broadcast channel registration start screen (not shown). This screen prompts the user to select an item "View digital broadcast" when the user intends to view a digital broadcast and select an item "Not view digital broadcast" when the user does not intend to do.

Figure 2:
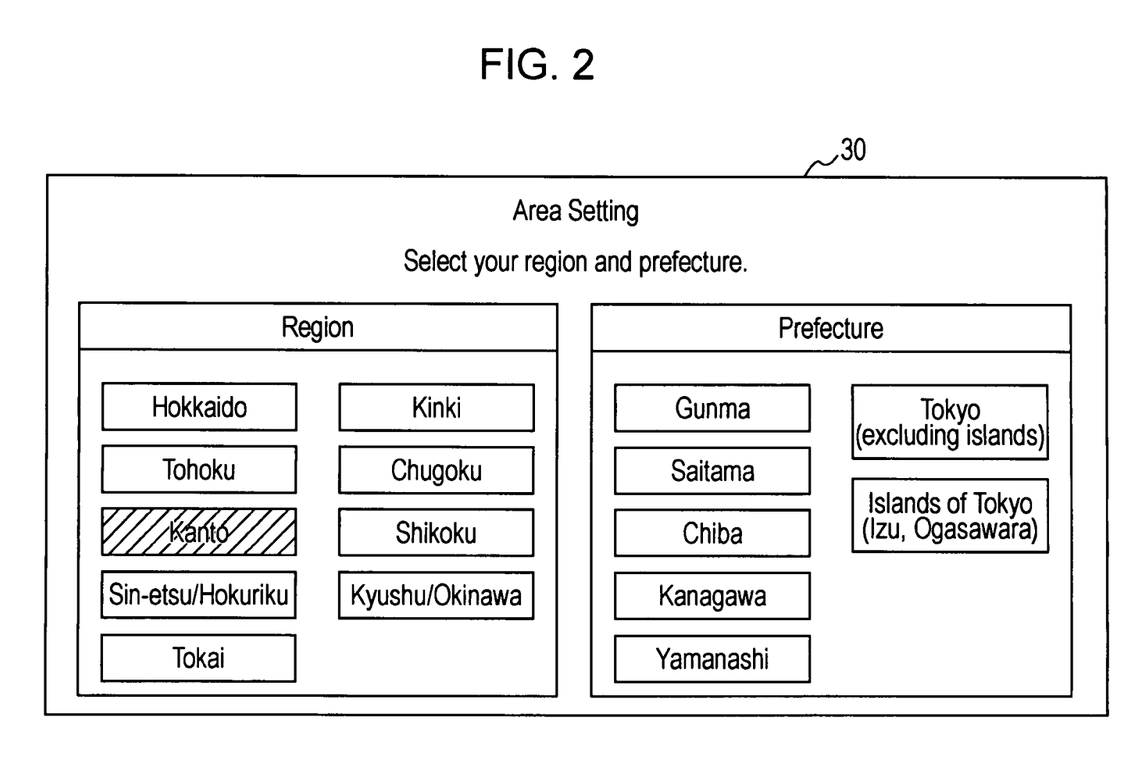
FIG. 2 is a schematic diagram illustrating an area setting screen.

When the host microcomputer 2 recognizes that the user has selected the item "View digital broadcast" by operating the remote controller RM, the host microcomputer 2 allows the display 12 to display a digital broadcast area setting screen 30.

FIG. 2 illustrates the area setting screen 30 displayed at that time. The area setting screen 30 prompts the user to select an installation area (region and prefecture) of the television broadcast receiving apparatus 1 for digital broadcast channel registration. When the host microcomputer 2 recognizes that the user has selected an installation area of the apparatus by operating the remote controller RM, the host microcomputer 2 sets the area as a digital broadcast area and writes information about the area into the RAM 21 to temporarily store the information in the RAM 21.

The host microcomputer 2 allows the display 12 to display a digital terrestrial broadcast channel registration start screen (not illustrated). This screen prompts the user to select an item "Register digital terrestrial broadcast channels" when the user intends to view a digital terrestrial broadcast and select an item "Not register digital terrestrial broadcast channels" when the user does not intend to do.

When the host microcomputer 2 recognizes that the user has selected the item "Register digital terrestrial broadcast channels" by operating the remote controller RM, the host microcomputer 2 determines whether the area set as the digital broadcast area is a "scanning area" where it is necessary to perform channel scanning. The term "scanning area" means an area where it is difficult to determine receivable digital terrestrial broadcast channels without channel scanning and automatic processing is not available, like an area out of a relay area covered by each digital terrestrial broadcast relay station. The host microcomputer 2 retrieves information related to the area set as the digital broadcast area from the RAM 21 and compares the retrieved information with information regarding "scanning areas" previously stored in the nonvolatile memory 4, thereby determining whether the area is a "scanning area".

When the host microcomputer 2 determines that the area set as the digital broadcast area is not a "scanning area", the host microcomputer 2 allows the display 12 to display a digital terrestrial broadcast channel registering method selection screen (not illustrated). This screen prompts the user to select either "Scanning" or "Automatic" for digital terrestrial broadcast channel registration.

Figure 3:
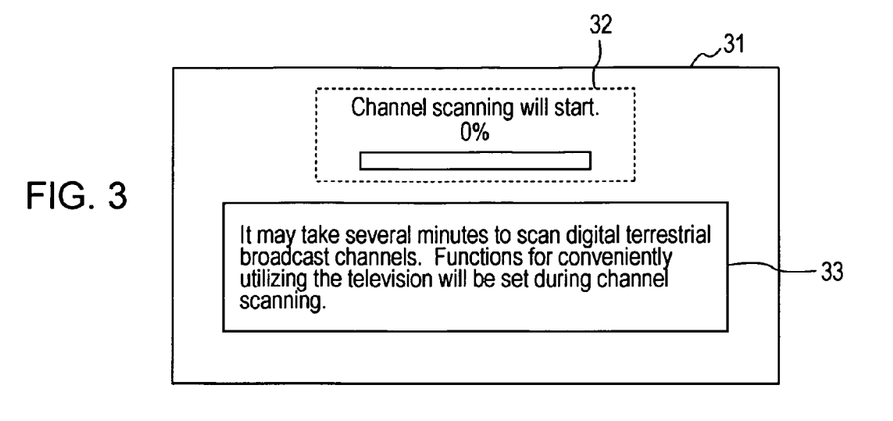
FIG. 3 is a schematic diagram illustrating a channel scanning start screen.

When the host microcomputer 2 recognizes that the user has selected "Scanning", alternatively, when the host microcomputer 2 determines that the area set as the digital broadcast area is a "scanning area", the host microcomputer 2 allows the display 12 to display a channel scanning start screen 31.

FIG. 3 illustrates the channel scanning start screen 31 displayed at that time. The channel scanning start screen 31 includes a channel-scanning start message display field 32 where a message indicating the start of channel scanning is displayed and a function-setting start message display field 33 where a message indicating that function settings will start simultaneously with the channel scanning is displayed. The function-setting start message display field 33 displays information indicating that various functions of the television broadcast receiving apparatus 1 will be set during the channel scanning because it may take several minutes to complete the channel scanning.

Figure 4:
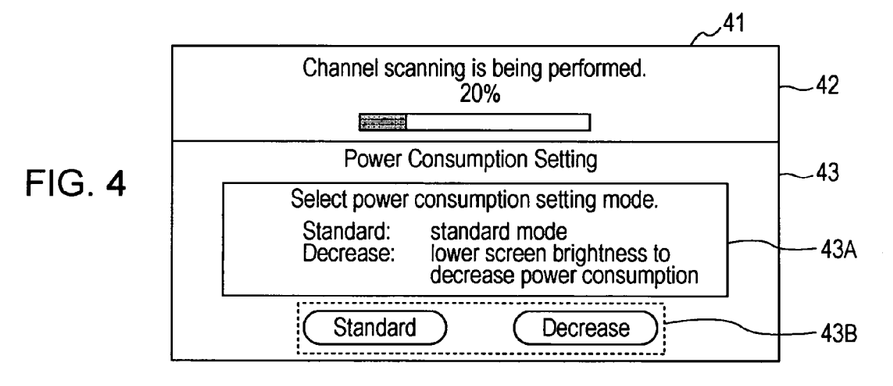
FIG. 4 is a schematic diagram illustrating a power consumption setting screen.

The host microcomputer 2 permits the channel scanning start screen 31 to be displayed for a predetermined period of time (for example, several seconds). After that, the host microcomputer 2 starts the channel scanning and also displays a power consumption setting screen 41 that prompts the user to select a power consumption setting mode, thereby starting power consumption setting. As described above, the television broadcast receiving apparatus 1 sets the various functions while performing the channel scanning in a background manner.

The channel scanning for digital terrestrial broadcasts will now be concretely described. First, the host microcomputer 2 allows the digital tuner 8 to scan broadcast channels. The digital tuner 8 obtains signal strengths of the respective broadcast channels by scanning, determines a broadcast channel having a signal strength of a predetermined value or higher as a receivable broadcast channel in this area, and sends information indicating the receivable broadcast channel or channels to the host microcomputer 2. The host microcomputer 2 registers the broadcast channels, determined as the receivable broadcast channels by the digital tuner 8, into a digital broadcast channel database constructed in the nonvolatile memory 4.

FIG. 4 illustrates the power consumption setting screen 41 displayed simultaneously with the start of channel scanning. The power consumption setting screen 41 includes a channel-scanning progress display field 42 where the progress status of channel scanning is displayed. Accordingly, the television broadcast receiving apparatus 1 can prompt the user to select a power consumption setting mode while being allowed to confirm the progress status of channel scanning. The power consumption setting screen 41 further includes a function setting display field 43 which includes an operating instruction display field 43A where an operating instruction for the user is displayed and an option display field 43B where options for setting are displayed.

In this instance, the operating instruction display field 43A displays a message that prompts the user to select either "Standard" or "Decrease", serving as a power consumption setting mode, as an operating instruction for the user. The setting mode "Standard" is factory default setting of the television broadcast receiving apparatus 1. The setting mode "Decrease" is setting in which the power consumption of the television broadcast receiving apparatus 1 can be lower than that in the "Standard" setting mode in exchange for a lower brightness of the screen of the display 12.

The option display field 43B displays "Standard" and "Decrease" as options for power consumption setting so as to prompt the user to select either of the setting modes by operating the remote controller RM.

When the host microcomputer 2 recognizes that the user has selected either "Standard" or "Decrease" as the power consumption setting mode by operating the remote controller RM, the host microcomputer 2 stores setting information regarding the setting into the nonvolatile memory 4 and terminates power consumption setting. Thus, the television broadcast receiving apparatus 1 can control the power consumption on the basis of the stored setting information.

Figure 5:
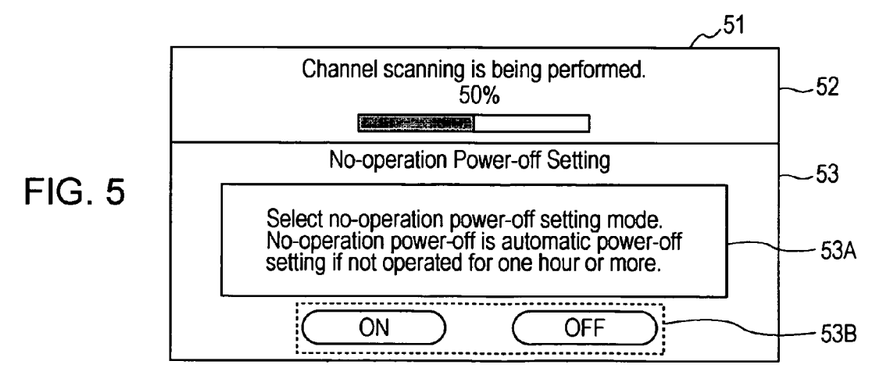
FIG. 5 is a schematic diagram illustrating a no-operation power-off setting screen.

At the completion of power consumption setting, the host microcomputer 2 allows the display 12 to display a no-operation power-off setting screen 51 that prompts the user to select a setting mode for non-operation power-off setting.

FIG. 5 illustrates the no-operation power-off setting screen 51 displayed at that time. The no-operation power-off setting screen 51 includes a channel-scanning progress display field 52 where the progress status of channel scanning is displayed. Accordingly, the television broadcast receiving apparatus 1 can prompt the user to select a setting mode for the no-operation power-off setting while being allowed to confirm the progress status of channel scanning. The no-operation power-off setting screen 51 further includes a function setting display field 53 which includes an operating instruction display field 53A where an operating instruction for the user is displayed and an option display field 53B where options for setting are displayed.

In this instance, the operating instruction display field 53A displays a message that prompts the user to select either "ON" or "OFF", serving as a no-operation power-off setting mode, as an operating instruction for the user. The setting mode "ON" is setting for automatically turning off the television broadcast receiving apparatus 1 when the apparatus is not operated for a predetermined period of time or longer. Such an automatic operation is also called "no-operation power-off operation". When the "ON" mode is set, therefore, the power consumption can be reduced while the television broadcast receiving apparatus 1 is not operated. The setting mode "OFF" is factory default setting of the television broadcast receiving apparatus 1. Selecting the "OFF" mode avoids the no-operation power-off operation.

The option display field 53B displays "ON" and "OFF" as the options for no-operation power-off setting so as to prompt the user to select either of the setting modes by operating the remote controller RM.

When the host microcomputer 2 recognizes that the user has selected either "ON" or "OFF" as the no-operation power-off setting mode by operating the remote controller RM, the host microcomputer 2 stores setting information regarding the setting into the nonvolatile memory 4 and terminates the no-operation power-off setting. Accordingly, the television broadcast receiving apparatus 1 can control the no-operation power-off operation on the basis of the stored setting information.

As described above, the television broadcast receiving apparatus 1 completes the power consumption setting and the no-operation power-off setting of the television broadcast receiving apparatus 1.

In the present embodiment, for example, the power consumption setting and the no-operation power-off setting are consecutively performed simultaneously with the channel scanning as described above. In addition to those settings, another setting to be effective so long as the setting is performed before the start of use of the apparatus may be performed.

Figure 6:
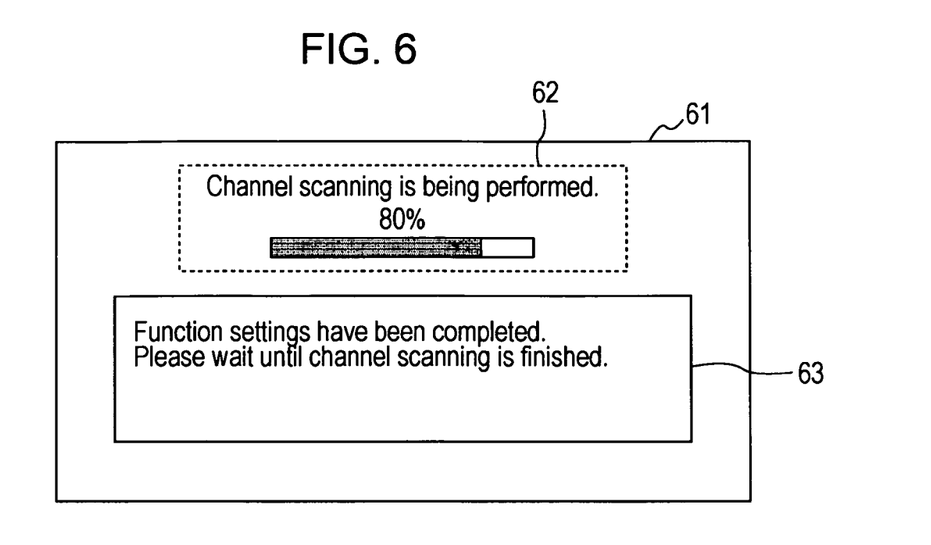
FIG. 6 is a schematic diagram illustrating a channel scanning screen.

If the channel scanning is not completed at the completion of the power consumption setting and the no-operation power-off setting, the host microcomputer 2 allows the display 12 to display a channel scanning screen 61 indicating that the channel scanning is being performed.

FIG. 6 illustrates the channel scanning screen 61 displayed at that time. The channel scanning screen 61 includes a channel-scanning progress display field 62 where the progress status of channel scanning is displayed and an operating instruction display field 63 where an operating instruction for the user is displayed. In this instance, the operating instruction display field 63 displays a message indicating that the settings of various functions of the television broadcast receiving apparatus 1 have been completed and the user has to wait until the channel scanning is finished.

Figure 7:
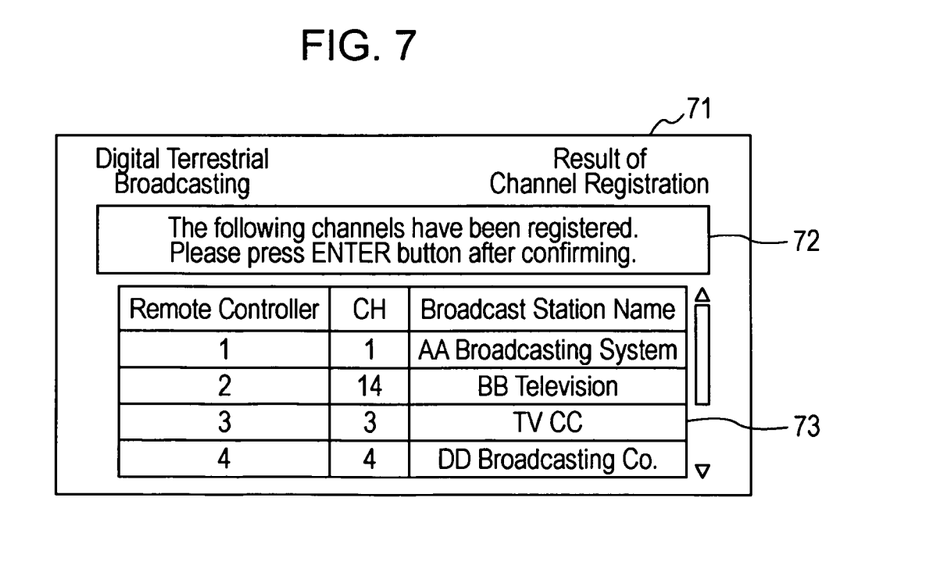
FIG. 7 is a schematic diagram illustrating a channel registration screen.

When the channel scanning is finished, the host microcomputer 2 allows the display 12 to display a channel registration screen 71 that displays digital terrestrial broadcast channels registered in the digital broadcast channel database.

Whereas, when the channel scanning is completed before the completion of the power consumption setting and the no-operation power-off setting, the host microcomputer 2 allows the display 12 to display the channel registration screen 71 relating to digital terrestrial broadcast channels just after the completion of those settings.

FIG. 7 illustrates the channel registration screen 71 displayed at that time. The channel registration screen 71 includes an operating instruction display field 72 where an operating instruction for the user is displayed and a registration display field 73 where broadcast channels registered as viewable channels are displayed. In this instance, the operating instruction display field 72 displays a message which indicates the completion of registration of digital terrestrial broadcast channels and which prompts the user to press the ENTER button of the remote controller RM after confirming the message.

As described above, the television broadcast receiving apparatus 1 performs the power consumption setting and the no-operation power-off setting simultaneously with the channel scanning for digital terrestrial broadcasts.

The television broadcast receiving apparatus 1 can therefore reduce the time to complete both of the settings and the channel scanning as compared to, for example, the case where those settings are performed before and after the channel scanning.

When the host microcomputer 2 recognizes that the user has selected "Automatic" in the channel registering method selection screen relating to digital terrestrial broadcasts by operating the remote controller RM, the host microcomputer 2 controls the respective components to perform automatic processing for digital terrestrial broadcasts.

The automatic processing for digital terrestrial broadcasts will now be concretely described. First, the host microcomputer 2 retrieves information about an area set as a digital broadcast area from the RAM 21. The host microcomputer 2 retrieves broadcast channel allocation information for the area from broadcast channel allocation information items for respective areas previously stored in the nonvolatile memory 4 and registers broadcast channels, indicated by the retrieved information, as receivable broadcast channels into the digital broadcast channel database.

At the completion of the digital-terrestrial-broadcast automatic processing, the host microcomputer 2 allows the display 12 to display the channel registration screen 71 displaying the digital terrestrial broadcast channels registered in the digital broadcast channel database.

In the case where the digital-terrestrial-broadcast automatic processing is performed, the television broadcast receiving apparatus 1 performs the power consumption setting and the no-operation power-off setting after the completion of the automatic processing. In the case where the automatic processing is performed, the channel scanning is not performed. Accordingly, the television broadcast receiving apparatus 1 can complete registration of digital terrestrial broadcast channels for a short time. In the case where the automatic processing is performed, therefore, the television broadcast receiving apparatus 1 can complete the registration of digital terrestrial broadcast channels and those settings for substantially the same period of time as that to perform the settings simultaneously with the channel scanning.

When the host microcomputer 2 recognizes that the user has pressed the ENTER button of the remote controller RM in the channel registration screen 71 relating to digital terrestrial broadcast channels, therefore, the host microcomputer 2 allows the display 12 to display a power consumption setting screen (not illustrated). The power consumption setting screen displayed at that time is substantially the same as the power consumption setting screen 41 but does not include the channel-scanning progress display field 42. In this screen, the power consumption can be set in the same way as in the power consumption setting screen 41. The host microcomputer 2 performs the power consumption setting in accordance with an operation on the remote controller RM.

At the completion of the power consumption setting, the host microcomputer 2 allows the display 12 to display a no-operation power-off setting screen (not illustrated). The no-operation power-off setting screen displayed at that time is substantially the same as the no-operation power-off setting screen 51 but does not include the channel-scanning progress display field 52. In this screen, the no-operation power-off setting can be performed in the same way as in the no-operation power-off setting screen 51. The host microcomputer 2 performs the no-operation power-off setting in accordance with an operation on the remote controller RM.

The television broadcast receiving apparatus 1 performs the registration of digital terrestrial broadcast channels, the power consumption setting, and the no-operation power-off setting in that manner.

After that, therefore, the television broadcast receiving apparatus 1 can receive and play broadcasts of the channels registered in the digital broadcast channel database. In other words, digital terrestrial broadcasts are viewable.

Furthermore, the television broadcast receiving apparatus 1 can control the power consumption and the no-operation power-off operation on the basis of the settings selected by the user.

At the completion of the registration of digital terrestrial broadcast channels, the power consumption setting, and the no-operation power-off setting of the television broadcast receiving apparatus 1, the host microcomputer 2 allows the display 12 to display a satellite antenna level confirmation screen (not shown).

This screen provides a message indicating whether the level of the antenna for digital satellite broadcasts reaches an acceptable level to the user and prompts the user to press a right button (not shown) of the remote controller RM after conforming the message. During the initial settings, therefore, the television broadcast receiving apparatus 1 can inform the user of whether digital satellite broadcasts are viewable.

When the host microcomputer 2 recognizes that the user has pressed the right button of the remote controller RM in the satellite antenna level confirmation screen, the host microcomputer 2 allows the display 12 to display a zip code setting screen (not shown) for data broadcasting. This screen prompts the user to enter a zip code of the installation area of the television broadcast receiving apparatus 1 in order to display local information upon data broadcasting. When the user enters the zip code of the installation area of the apparatus by operating numeric buttons (not illustrated) of the remote controller RM, the host microcomputer 2 sets the zip code as information specifying a data broadcasting area and stores the set information into the nonvolatile memory 4. Consequently, the television broadcast receiving apparatus 1 can display local information for the installation area of the apparatus upon data broadcasting.

At the completion of setting the zip code for data broadcasting, the host microcomputer 2 allows the display 12 to display an initial settings completion screen (not shown). This screen provides a message indicating that all of the initial settings have been completed to the user and prompts the user to press the ENTER button of the remote controller RM after confirming the message. When recognizing that the user has pressed the ENTER button of the remote controller RM, the host microcomputer 2 completes the initial settings.

After the completion of the initial settings as described above, the television broadcast receiving apparatus 1 permits the user to use the functions of, for example, receiving and playing digital broadcasts and analog broadcasts.

As described so far, the power consumption setting and the no-operation power-off setting are performed as the initial settings of the television broadcast receiving apparatus 1 simultaneously with the execution of the channel scanning. Accordingly, the television broadcast receiving apparatus 1 can reduce the time to complete the channel scanning and those settings as compared to the case where the settings are performed before and after the channel scanning. Thus, the time to complete the initial settings can be reduced.

Consequently, the television broadcast receiving apparatus 1 can permit the user to start using the apparatus more immediately than the case where the various functions are set before and after the channel scanning.

Procedure of Initial Settings

Figure 8:
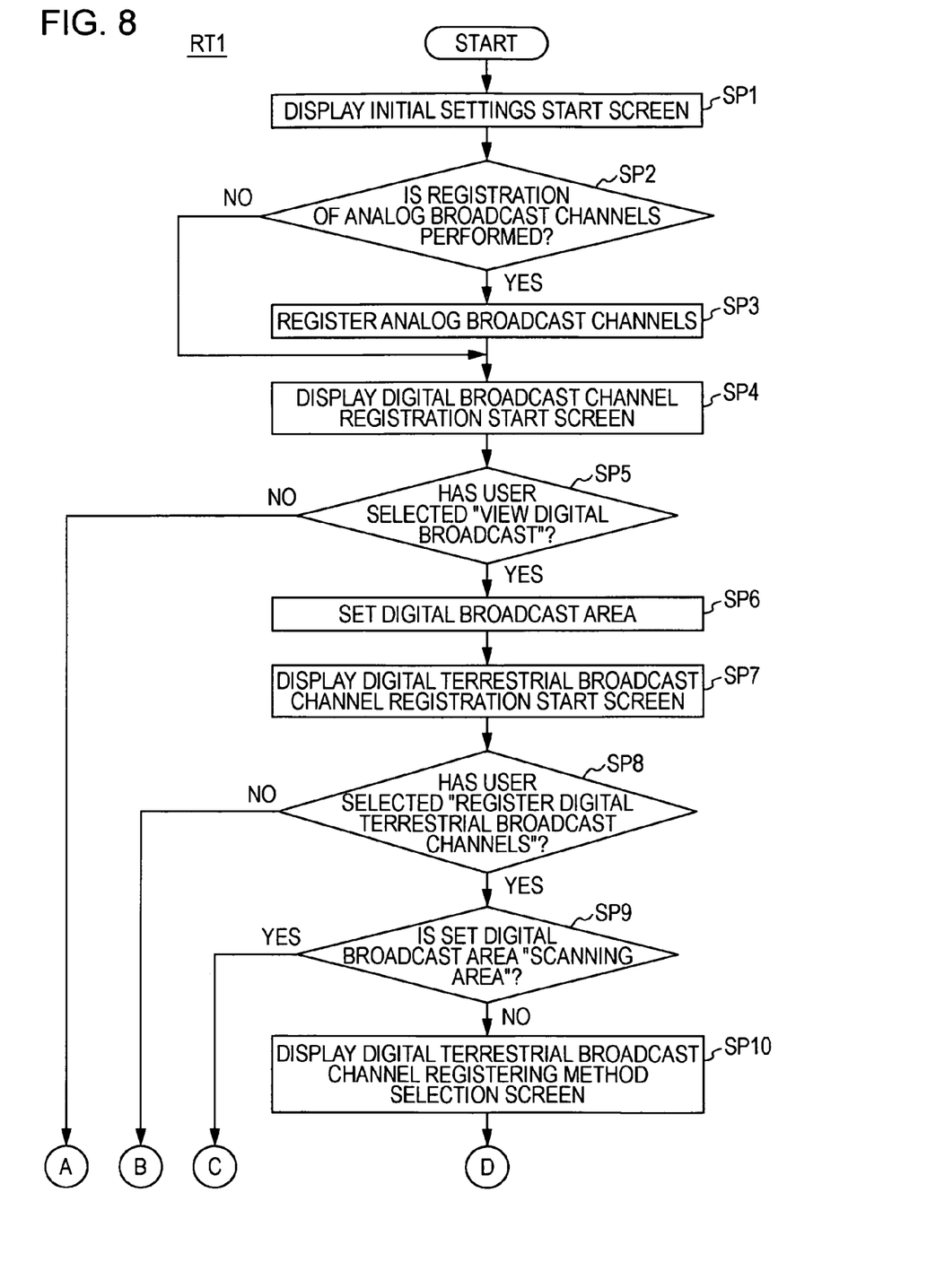
FIG. 8 is a flowchart of an initial settings routine.
Figure 9:
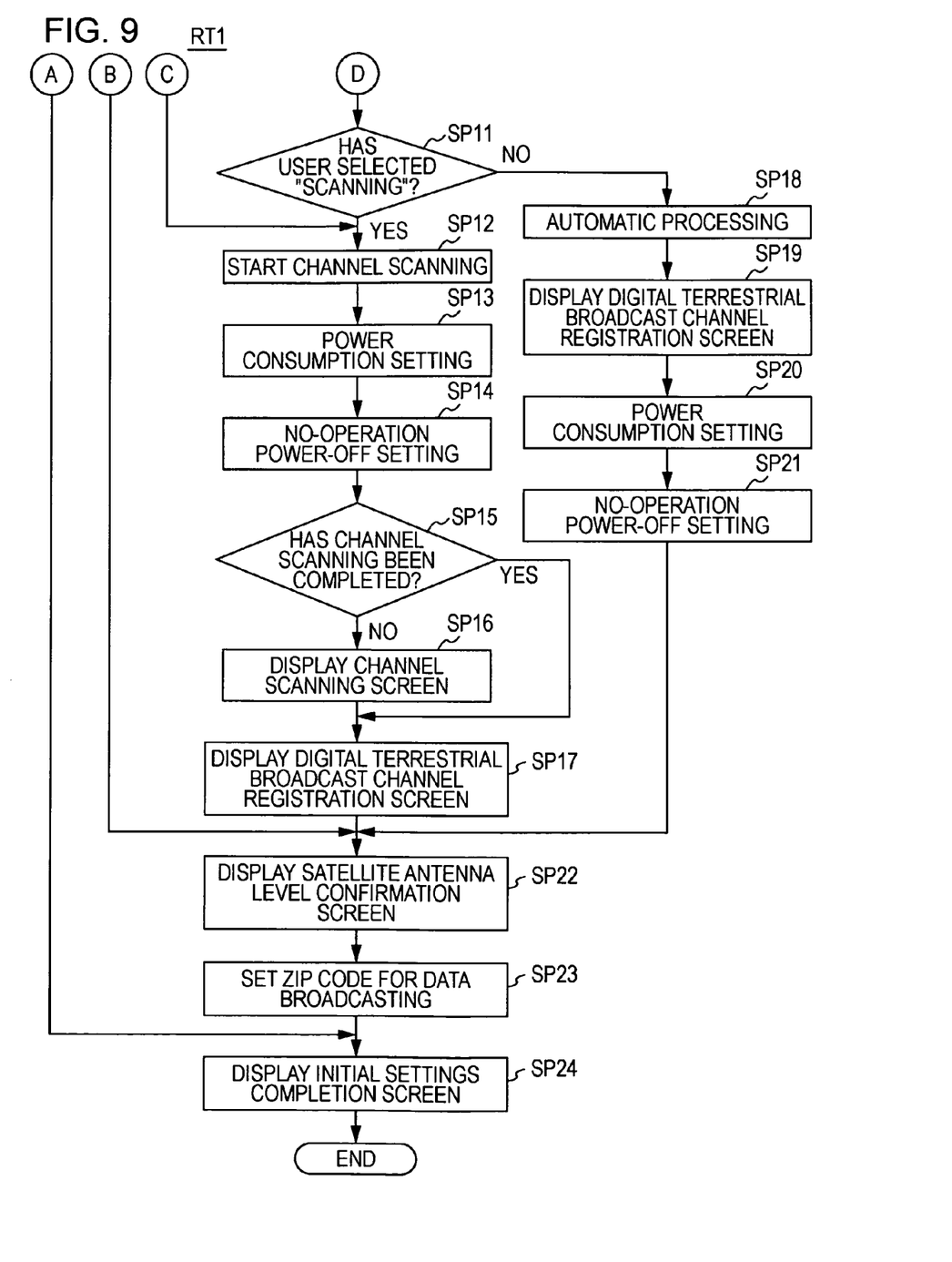
FIG. 9 is a continuation of the flowchart of FIG. 8.

A procedure of initial settings (hereinafter, also referred to as "initial settings routine") performed by the television broadcast receiving apparatus 1 will be described in detail with reference to a flowchart of FIGS. 8 and 9. This initial settings routine, indicated at RT1, is performed by the host microcomputer 2 of the television broadcast receiving apparatus 1 in accordance with a program read out from the internal memory (not shown) or the nonvolatile memory 4.

When the host microcomputer 2 of the television broadcast receiving apparatus 1 recognizes that the apparatus has been turned on while the initial settings of the apparatus are not yet performed, the host microcomputer 2 starts the initial settings routine RT1, thus proceeding to step SP1. In step SP1, the host microcomputer 2 allows the display 12 to display the initial settings start screen. The host microcomputer 2 then proceeds to step SP2 in accordance with an operation on the remote controller RM.

In step SP2, the host microcomputer 2 determines whether to register analog broadcast channels on the basis of whether the user has selected the item "Register analog broadcast channels" in the analog broadcast channel registration start screen.

If the user has selected the item "Register analog broadcast channels" to register analog broadcast channels, namely, if YES in step SP2, the host microcomputer 2 proceeds to step SP3.

In step SP3, the host microcomputer 2 registers analog broadcast channels by channel scanning or automatic processing. Then, the host microcomputer 2 proceeds to step SP4. Thus, the television broadcast receiving apparatus 1 can receive and play analog broadcasts of the registered analog broadcast channels.

Whereas, if the user has selected the item "Not register analog broadcast channels", namely, if NO in step SP2, the host microcomputer 2 proceeds to step SP4 without registering analog broadcast channels.

In step SP4, the host microcomputer 2 allows the display 12 to display the digital broadcast channel registration start screen. Then, the host microcomputer 2 proceeds to step SP5.

In step SP5, the host microcomputer 2 determines whether the user has selected the item "View digital broadcast" in the digital broadcast channel registration start screen by operating the remote controller RM.

If YES in step SP5 because the user has selected the item "View digital broadcast" by operating the remote controller RM, the host microcomputer 2 proceeds to step SP6.

In step SP6, the host microcomputer 2 allows the display 12 to display the digital broadcast area setting screen 30. The host microcomputer 2 sets an area, which the user has selected by operating the remote controller RM, as a digital broadcast area. Then, the host microcomputer 2 proceeds to step SP7.

In step SP7, the host microcomputer 2 allows the display 12 to display the digital terrestrial broadcast channel registration start screen. Then, the host microcomputer 2 proceeds to step SP8.

In step SP8, the host microcomputer 2 determines whether the user has selected the item "Register digital terrestrial broadcast channels" in the digital terrestrial broadcast channel registration start screen by operating the remote controller RM.

If YES in step SP8 because the user has selected the item "Register digital terrestrial broadcast channels" by operating the remote controller RM, the host microcomputer 2 proceeds to step SP9.

In step SP9, the host microcomputer 2 determines whether the area set in the digital broadcast area setting screen 30 is a "scanning area".

If NO in step SP9 because the area set in the digital broadcast area setting screen 30 is not a "scanning area", the host microcomputer 2 proceeds to step SP10.

In step SP10, the host microcomputer 2 allows the display 12 to display the digital terrestrial broadcast channel registering method selection screen that prompts the user to select either "Scanning" or "Automatic" as a method of registering channels. Then, the host microcomputer 2 proceeds to step SP11.

In step SP11, the host microcomputer 2 determines whether the user has selected "Scanning" in the digital terrestrial broadcast channel registering method selection screen by operating the remote controller RM.

If YES in step SP11 because the user has selected "Scanning" by operating the remote controller RM, the host microcomputer 2 proceeds to step SP12.

Whereas, if YES in step SP9 because the area set in the digital broadcast area setting screen 30 is a "scanning area", this means that the "automatic" method is not available for channel registration in the installation area of the apparatus. In this case, the "scanning" method is automatically used for channel registration. Accordingly, the host microcomputer 2 proceeds to step SP12 without allowing the display 12 to display the digital terrestrial broadcast channel registering method selection screen.

If YES in step SP9, alternatively, when processing in step SP11 is completed, in step SP12, the host microcomputer 2 allows the display 12 to display the channel scanning start screen 31. After a lapse of a predetermined period of time, the host microcomputer 2 starts digital terrestrial broadcast channel scanning and proceeds to step SP13.

In step SP13, the host microcomputer 2 allows the display 12 to display the power consumption setting screen 41 and starts power consumption setting. The host microcomputer 2 sets the power consumption in accordance with an operation on the remote controller RM while performing channel scanning in a background manner. Then, the host microcomputer 2 proceeds to step SP14.

In step SP14, the host microcomputer 2 allows the display 12 to display the no-operation power-off setting screen 51 and starts no-operation power-off setting. The host microcomputer 2 performs the no-operation power-off setting in accordance with an operation on the remote controller RM while performing the channel scanning in a background manner. Then, the host microcomputer 2 proceeds to step SP15.

As described above, the television broadcast receiving apparatus 1 performs the power consumption setting and the no-operation power-off setting simultaneously with the digital terrestrial broadcast channel scanning.

Accordingly, the television broadcast receiving apparatus 1 can reduce the time to complete the power consumption setting, the no-operation power-off setting, and the channel scanning as compared to the case where those settings are performed before and after the channel scanning.

In step SP15, the host microcomputer 2 determines whether the digital terrestrial broadcast channel scanning has been completed.

If NO in step SP15 because the digital terrestrial broadcast channel scanning is being performed and is not yet completed, the host microcomputer 2 proceeds to step SP16.

In step SP16, the host microcomputer 2 allows the display 12 to display the channel scanning screen 61. When the digital terrestrial broadcast channel scanning is completed and registration of broadcast channels into the digital broadcast channel database is completed, the host microcomputer 2 proceeds to step SP17.

Whereas, if YES in step SP15 because the digital terrestrial broadcast channel scanning has been completed, the host microcomputer 2 proceeds to step SP17 without allowing the display 12 to display the channel scanning screen 61.

In step SP17, the host microcomputer 2 allows the display 12 to display the digital terrestrial broadcast channel registration screen 71. Thus, the user is enabled to view digital terrestrial broadcast channels which are viewable in the television broadcast receiving apparatus 1. Then, the host microcomputer 2 proceeds to step SP22 in accordance with an operation on the remote controller RM.

Whereas, if NO in step SP11 because the user has selected not "Scanning" but "Automatic" in the digital terrestrial broadcast channel registering method selection screen by operating the remote controller RM, the host microcomputer 2 proceeds to step SP18.

In step SP18, the host microcomputer 2 performs automatic processing. Specifically, the host microcomputer 2 registers broadcast channels into the digital broadcast channel database on the basis of the area set in the digital broadcast area setting screen. Then, the host microcomputer 2 proceeds to step SP19.

In step SP19, the host microcomputer 2 allows the display 12 to display the digital terrestrial broadcast channel registration screen 71. The host microcomputer 2 proceeds to step SP20 in accordance with an operation on the remote controller RM.

In step SP20, the host microcomputer 2 performs the power consumption setting in accordance with an operation on the remote controller RM. Then, the host microcomputer 2 proceeds to step SP21.

In step SP21, the host microcomputer 2 performs the no-operation power-off setting in accordance with an operation on the remote controller RM. Then, the host microcomputer 2 proceeds to step SP22.

If NO in step SP8 because the user has selected the item "Not register digital terrestrial broadcast channels" by operating the remote controller RM, the host microcomputer 2 proceeds to step SP22 without registering digital terrestrial broadcast channels.

If NO in step SP8, alternatively, when processing in step SP17 or SP21 is completed, in step SP22, the host microcomputer 2 allows the display 12 to display the satellite antenna level confirmation screen. Then, the host microcomputer 2 proceeds to step SP23 in accordance with an operation on the remote controller RM.

In step SP23, the host microcomputer 2 sets a zip code for data broadcasting in accordance with an operation on the remote controller RM. Then, the host microcomputer 2 proceeds to step SP24.

If NO in step SP5 because the user has selected the item "Not view digital broadcast", the host microcomputer 2 proceeds to step SP24 without registering digital terrestrial broadcast channels and confirming a satellite antenna level.

If NO in step SP5, alternatively, when processing in step SP23 is completed, in step SP24, the host microcomputer 2 allows the display 12 to display the initial settings completion screen. The host microcomputer 2 terminates the initial settings routine RT1 in accordance with an operation on the remote controller RM.

According to the initial settings routine RT1, the host microcomputer 2 implements the initial settings. After the implementation of the initial settings, the television broadcast receiving apparatus 1 enables the user to use the functions of receiving and playing analog broadcasts and digital broadcasts.

Operation and Advantages

With the above-described structure, the host microcomputer 2 of the television broadcast receiving apparatus 1 starts the initial settings including registration of digital terrestrial broadcast channels and various function settings when the apparatus is turned on while the initial settings are not yet performed. In the present embodiment, as for the various function settings in the initial settings, settings to be effective so long as the settings are performed before the start of use of the apparatus, for example, the power consumption setting and the no-operation power-off setting are performed.

The host microcomputer 2 allows the display 12 to display the screens for the various function settings and sets the various functions in accordance with user operations while implementing the digital terrestrial broadcast channel scanning in a background manner.

Consequently, the television broadcast receiving apparatus 1 can complete the initial settings more rapidly than the case where the various function settings including, e.g., the power consumption setting which are preferable to be performed before the start of use of the apparatus are implemented before and after the channel scanning.

With the above-described structure, the television broadcast receiving apparatus 1 simultaneously performs the digital terrestrial broadcast channel scanning and the various function settings of the apparatus.

Consequently, the television broadcast receiving apparatus 1 can reduce the time to complete the channel scanning and the various function settings as compared to the case where the various function settings are performed before and after the channel scanning.

Advantageously, the television broadcast receiving apparatus 1 can allow the user to start the use of the apparatus more immediately than related-art television broadcast receiving apparatuses.

First Modification

In the above-described embodiment, the television broadcast receiving apparatus 1 performs the power consumption setting and the no-operation power-off setting as the various function settings implemented simultaneously with the digital terrestrial broadcast channel scanning.

The present invention is not limited to the above-described embodiment. Other various settings may be performed simultaneously with channel scanning so long as the settings are implemented independently of the channel scanning.

For example, although the zip code setting for data broadcasting is performed after the channel scanning in the above-described embodiment, the zip code setting may be implemented simultaneously with the channel scanning. Consequently, the television broadcast receiving apparatus 1 can reduce the time to complete the initial settings as compared to the case where the zip code setting for data broadcasting is implemented after the channel scanning.

In addition, settings to be more effective so long as the settings are performed before, rather than after, the start of use of the television broadcast receiving apparatus 1 may be implemented simultaneously with the channel scanning.

For example, a light sensor may be set simultaneously with the channel scanning. When the light sensor is set to "ON" mode, the television broadcast receiving apparatus 1 automatically controls the brightness of a video image displayed on the screen in accordance with the intensity of ambient light of the apparatus. In this case, it is assumed that the television broadcast receiving apparatus 1 is provided with the light sensor (not illustrated) which determines the intensity of ambient light of the apparatus.

For example, a function of controlling the power consumption under no-signal conditions may be set simultaneously with the channel scanning. When this function is set to "ON" mode, the television broadcast receiving apparatus 1 automatically reduces the power consumption in a case where the display 12 receives no signals and displays no images for a predetermined period of time or longer.

In addition, for example, time display may be set simultaneously with the channel scanning. When the time display is set to "ON" mode, the television broadcast receiving apparatus 1 allows the display 12 to display time at all times while the user is viewing a program. In this case, it is assumed that the television broadcast receiving apparatus 1 is provided with an internal clock (not illustrated) which manages display time.

Furthermore, for example, channel information display may be set simultaneously with the channel scanning. When the channel information display is set to "ON" mode, the television broadcast receiving apparatus 1 allows the display 12 to display an information window showing information about programs of broadcast channels in a broadcast channel selection screen.

In addition, for example, a network connecting function may be set simultaneously with the channel scanning. The television broadcast receiving apparatus 1 has the network connecting function that allows connection to a network and also allows the display 12 to display an image of a website which the user designates by operating the remote controller RM. The network connecting function includes various setting items, e.g., connection speed setting. In this case, the television broadcast receiving apparatus 1 connects to the network through the network terminal 19 and the network controller 20.

Furthermore, for example, an EPG information acquiring function may be set simultaneously with the channel scanning. The EPG information acquiring function includes various setting items, e.g., area setting for displaying electronic program listing appropriate to the installation area of the television broadcast receiving apparatus 1 and setting of a time range for acquisition of EPG information (for example, selection between acquisition of two days and acquisition of one week).

Accordingly, the television broadcast receiving apparatus 1 can realize various functions at the start of use of the apparatus on the basis of the settings selected by the user, the various functions being preferable to be set before the start of use of the apparatus. Since the television broadcast receiving apparatus 1 permits the user to use the above-described functions at the start of use of the apparatus, therefore, the television broadcast receiving apparatus 1 can allow the user to use the apparatus more conveniently than the case where the above-described functions are not set during the initial settings.

In the above-described embodiment, as for the various function settings performed simultaneously with the digital terrestrial broadcast channel scanning, the power consumption setting and the no-operation power-off setting, namely, the two settings are implemented.

The present invention is not limited to the above-described embodiment. Any number of settings may be performed simultaneously with the channel scanning so long as the settings can be implemented independently of the channel scanning.

In the above-described embodiment, when the various function settings are performed simultaneously with the digital terrestrial broadcast channel scanning, the power consumption setting is first implemented and the no-operation power-off setting is subsequently performed.

The present invention is not limited to the embodiment. Any number of settings may be performed in any order so long as the settings can be implemented independently of the channel scanning.

Second Modification

In the above-described embodiment, the television broadcast receiving apparatus 1 starts the various function settings simultaneously with the start of the digital terrestrial broadcast channel scanning.

The present invention is not limited to the embodiment. The television broadcast receiving apparatus 1 may start the various function settings in accordance with user operations after the start of the channel scanning while implementing the channel scanning in a background manner.

Specifically, for example, after the television broadcast receiving apparatus 1 recognizes that the user has selected "Scanning" in the digital terrestrial broadcast channel registering method selection screen, the apparatus starts the channel scanning and also allows the display 12 to display a function setting start screen (not shown). The function setting start screen prompts the user to press the ENTER button of the remote controller RM when the user wants to start the settings of the various functions of the television broadcast receiving apparatus 1. When recognizing that the user has pressed the ENTER button of the remote controller RM, the television broadcast receiving apparatus 1 starts the various function settings.

Third Modification

In the above-described embodiment, after the completion of the various function settings performed simultaneously with the channel scanning in accordance with user operations, broadcast channels registered by the channel scanning are displayed.

The present invention is not limited to the embodiment. The television broadcast receiving apparatus 1 may interrupt the various function settings at the completion of the channel scanning and display broadcast channels registered by the channel scanning.

In this case, it is assumed that each of the various function settings is previously determined as to whether the function setting is a first type in which the function has to be set before the start of use of the television broadcast receiving apparatus 1 or a second type in which the function may be set optionally though it is preferable to set the function before the start of use of the apparatus. During the initial settings, the television broadcast receiving apparatus 1 sets functions that have to be set before the start of use of the apparatus first. At the completion of the channel scanning, if the television broadcast receiving apparatus 1 is setting the functions that have to be set before the start of use of the apparatus, the apparatus continues to set the functions. At the completion of settings of all of the functions that have to be set before the start of use of the television broadcast receiving apparatus 1, the apparatus allows the display 12 to display broadcast channels registered by the channel scanning. At the completion of the channel scanning, if the television broadcast receiving apparatus 1 is setting the functions that may be set optionally before the start of use of the apparatus, the apparatus interrupts the settings and immediately allows the display 12 to display broadcast channels registered by the channel scanning.

As described above, the television broadcast receiving apparatus 1 can complete the initial settings more rapidly to permit the user to start using the apparatus by reducing as much as possible the time which is necessary to set the various functions and which does not overlap the time to perform the channel scanning.

Fourth Modification

In the above-described embodiment, the various function settings predetermined as the initial settings are performed simultaneously with the channel scanning.

The present invention is not limited to the embodiment. A list of various function settings which can be performed independently of the channel scanning may be displayed so that the user is prompted to select any function setting to be performed simultaneously with the channel scanning from the list by operating the remote controller RM.

In this case, for example, after the start of the channel scanning, the television broadcast receiving apparatus 1 allows the display 12 to display a settings list screen (not illustrated) showing the various function settings which can be performed independently of the channel scanning. The television broadcast receiving apparatus 1 prompts the user to select any setting to be performed simultaneously with the channel scanning by operating the remote controller RM and allows the display 12 to display a setting screen (not shown) relating to the setting. At the completion of the setting in accordance with an operation on the remote controller RM, the television broadcast receiving apparatus 1 can again allow the display 12 to display the settings list screen so that the user is prompted to select any setting which the user wants to perform subsequently.

The above-described settings enable the television broadcast receiving apparatus 1 to operate on the basis of the settings selected by the user at the start of use of the apparatus. Advantageously, the television broadcast receiving apparatus 1 can allow the user to conveniently use the apparatus.

Fifth Modification

The foregoing embodiment has been described with respect to the case where the television broadcast receiving apparatus 1 performs the various function settings of the apparatus simultaneously with the digital terrestrial broadcast channel scanning which is implemented during the initial settings.

The present invention is not limited to the embodiment. The various function settings of the television broadcast receiving apparatus 1 may be performed simultaneously with channel scanning which is implemented when, for example, the state of receiving digital terrestrial broadcasts is changed.

Accordingly, the television broadcast receiving apparatus 1 can prevent the user from waiting with no operations during the channel scanning and allow the user to select the various function settings to effectively utilize waiting time during the channel scanning.

Sixth Modification

The foregoing embodiment has been described with respect to the case where the television broadcast receiving apparatus 1 performs the various function settings of the apparatus simultaneously with the digital terrestrial broadcast channel scanning.

The present invention is not limited to the embodiment. The various function settings of the television broadcast receiving apparatus 1 may be performed simultaneously with analog terrestrial broadcast channel scanning. Target channels to be scanned are not limited to the existing digital terrestrial broadcasts and analog terrestrial broadcasts. If there is a broadcast channel that has to be subjected to channel scanning, the function settings of the apparatus may be performed during scanning of the broadcast channel.

Seventh Modification

The foregoing embodiment has been described with respect to the case where the present invention is applied to the television broadcast receiving apparatus 1 supporting analog and digital terrestrial broadcasts.

The present invention is not limited to the embodiment. The present invention may be applied to a broadcast receiving apparatus that supports only digital terrestrial broadcasts. The present invention may be applied to a broadcast receiving apparatus that supports various broadcasts which are not limited to the existing digital terrestrial broadcasts and have to be subjected to channel scanning.

Eighth Modification

In the foregoing embodiment, the program for executing the initial settings routine RT1 is previously stored in the internal memory (not shown) or the nonvolatile memory 4.

The present invention is not limited to the embodiment. For example, the television broadcast receiving apparatus 1 may download the program from a server on the network through the network controller 20 and the network terminal 19 to install the program into the internal memory (not shown) or the nonvolatile memory 4.

Alternatively, the program may be recorded on a recording medium, such as an optical disk, and the television broadcast receiving apparatus 1 may read out the program from the recording medium to install the program into the internal memory (not shown) or the nonvolatile memory 4.

In this case, it is assumed that the television broadcast receiving apparatus 1 is further connected to a medium drive capable of reading out the program from the recording medium.

Ninth Modification

In the foregoing embodiment, the television broadcast receiving apparatus 1, serving as a broadcast receiving apparatus, includes the digital tuner 8 which serves as a channel scanning unit and the host microcomputer 2 which serves as the channel scanning unit, a function setting unit, and a control unit.

The present invention is not limited to the embodiment. The units having the above-described functions may be replaced with various hardware components. For example, the channel scanning unit, the function setting unit, and the control unit may be realized by individual hardware components or individual software components.

Tenth Modification

The present invention is not limited to the foregoing embodiment and the above-described first to ninth modifications. In other words, the scope of application of the present invention includes any combination of parts or all of the foregoing embodiment and the above-described first to ninth modifications and also includes extraction of part thereof.

For example, the foregoing embodiment may be combined with the fourth and fifth modifications. In this case, the television broadcast receiving apparatus 1 can implement the various function settings simultaneously with the channel scanning while prompting the user to select a desired setting at any time including, but not limited to, the time for the initial settings. Accordingly, the television broadcast receiving apparatus 1 can allow the user to effectively utilize waiting time during the channel scanning at any time including, but not limited to, the time for the initial settings.

It should be understood by those skilled in the art that various modifications, combinations, sub-combinations and alterations may occur depending on design requirements and other factors insofar as they are within the scope of the appended claims or the equivalents thereof.

What is claimed is:

1. A broadcast receiving apparatus comprising:
   a channel scanning unit configured to perform a channel scanning process of scanning broadcast channels to be received, determining on each scanned broadcast channel whether the channel is receivable, and registering a broadcast channel determined as receivable;
   a function setting unit configured to perform settings of various functions; and
   a control unit configured to control the channel scanning unit and the function setting unit so that the channel scanning process is performed simultaneously with the settings of the various functions by a user,
   wherein the settings performed by the function setting unit include setting of a desired power consumption control mode which is selected from a plurality of available power consumption modes by the user, wherein, after completion of the setting of the desired power consumption control mode, the function setting unit enables the user to select setting of an automatic turning off mode for automatically turning off the broadcast receiving apparatus when the user does not operate the apparatus for a predetermined period of time, and wherein the setting of the desired power consumption mode and the setting of the automatic turning off mode are both performed simultaneously with performing the channel scanning process such that both the desired power consumption mode and the automatic turning off mode are settable by the user while the channel scanning process is being performed so as to effectively be settable in parallel with the performing of the channel scanning process a display control unit configured to allow a display unit to display both of a progress status of the channel scanning process performed by the channel scanning unit and a setting screen for the settings of the various functions performed by the function setting unit.

2. The apparatus according to claim 1, wherein the settings performed by the function setting unit are effective so long as the settings are performed before the start of use of the broadcast receiving apparatus.

3. A method for setting a broadcast receiving apparatus, the method including the steps of:

performing a channel scanning process of scanning broadcast channels to be received, determining on each scanned broadcast channel whether the channel is receivable, and registering a broadcast channel determined as receivable;

performing settings of various functions; and performing control so that the channel scanning process is performed simultaneously with the settings of the various functions by a user, wherein the settings performed include setting of a desired power consumption control mode which is selected from a plurality of available power consumption modes by the user, wherein, after completion of the setting of the desired power consumption control mode, the function setting unit enables the user to select setting of an automatic turning off mode for automatically turning off the broadcast receiving apparatus when the user does not operate the apparatus for a predetermined period of time, and wherein the setting of the desired power consumption mode and the setting of the automatic turning off mode are both performed simultaneously with performing the channel scanning process such that both the desired power consumption mode and the automatic turning off mode are settable by the user while the channel scanning process is being performed so as to effectively be settable in parallel with the performing of the channel scanning process displaying both of a progress status of the channel scanning process performed by the channel scanning unit and a setting screen for the settings of the various functions performed by the function setting unit.

4. A non-transitory computer readable memory having stored thereon a program for setting a broadcast receiving apparatus, the program allowing the broadcast receiving apparatus to perform the steps of:

performing a channel scanning process of scanning broadcast channels to be received, determining on each scanned broadcast channel whether the channel is receivable, and registering a broadcast channel determined as receivable;

performing settings of various functions; and performing control so that the channel scanning process is performed simultaneously with the settings of the various functions by a user, wherein the settings performed include setting of a desired power consumption control mode which is selected from a plurality of available power consumption modes by the user, wherein, after completion of the setting of the desired power consumption control mode, the function setting unit enables the user to select setting of an automatic turning off mode for automatically turning off the broadcast receiving apparatus when the user does not operate the apparatus for a predetermined period of time, and wherein the setting of the desired power consumption mode and the setting of the automatic turning off mode are both performed simultaneously with performing the channel scanning process such that both the desired power consumption mode and the automatic turning off mode are settable by the user while the channel scanning process is being performed so as to effectively be settable in parallel with the performing of the channel scanning process displaying both of a progress status of the channel scanning process performed by the channel scanning unit and a setting screen for the settings of the various functions performed by the function setting unit.

5. The apparatus according to claim 1, wherein the plurality of available power consumption modes include a standard mode and a decrease mode, in which the standard mode has a power consumption associated therewith that is set at a factory and in which the decrease mode has a power consumption associated therewith which is lower than that of the standard mode.

6. The apparatus according to claim 1, wherein the functions respectively associated with the setting of the desired power consumption mode and selecting of the setting of the function of automatically turning off the broadcast receiving apparatus are separate from and are not associated with the channel scanning process.

* * * * *